UNITED STATES PATENT OFFICE.

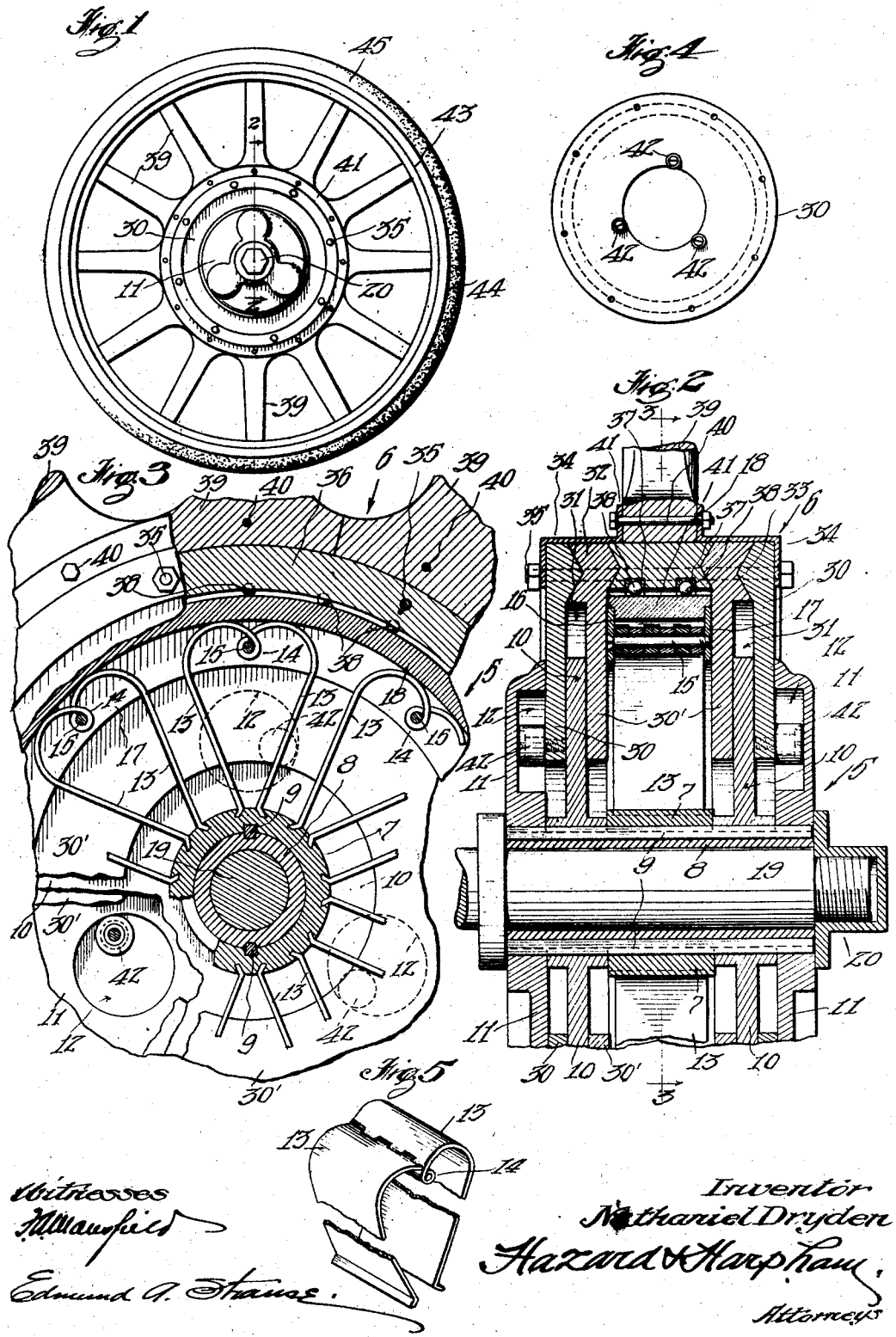

NATHANIEL DRYDEN, OF LOS ANGELES, CALIFORNIA.

VEHICLE-WHEEL.

No. 878,713.　　　　Specification of Letters Patent.　　　　Patented Feb. 11, 1908.

Application filed November 19, 1906. Serial No. 344,050.

*To all whom it may concern:*

Be it known that I, NATHANIEL DRYDEN, a citizen of the United States, residing at Los Angeles, in the county of Los Angeles and State of California, have invented new and useful Improvements in Vehicle-Wheels, of which the following is a specification.

This invention relates to an interacting elastic vehicle wheel, and an object thereof is to provide a wheel that will absorb the shocks occasioned a vehicle by passing rapidly over rough roads.

Another object is to provide a vehicle wheel that will combine the durability and good tractive properties of a solid tire with the resiliency of a pneumatic, while effectually protecting the latter from injury or other strains of travel.

A further object is to provide a wheel in which the resilient means are entirely incased, thereby preventing accidental displacement or injury thereto.

I accomplish these objects by means of the device described herein and illustrated in the accompanying drawings, in which:

Figure 1.— is a side elevation of my improved wheel. Fig. 2.— is an enlarged transverse section taken on line 2—2 of Fig. 1. Fig. 3.— is an enlarged sectional detail taken on line 3—3 of Fig. 2. Fig. 4.— is an inner face view of the plate carrying the recess engaging pins. Fig. 5.— is a perspective view of a pair of supporting springs.

As illustrated in the drawings, the wheel is composed of two members, an inner or hub carrying member 5, and an outer or spoke carrying member 6. The inner member 5 comprises a hub 7 having a bushing 8 held in place therein by keys 9. Secured to hub 7 by keys 9 are a plurality of annular guide plates 10 and outside face plates 11, which have a plurality of annular recesses or depressions 12. Rigidly secured at their lower ends to the hub 7 in a suitable manner are a series of springs 13 arranged in pairs, their tops terminating in a hinge joint 14, through which passes a bolt 15. This bolt is adapted to pass through annular inwardly extending members 16 and 17, being in screw threaded engagement with member 17. Members 16 and 17 are rigidly secured to an annular track or inner felly 18. Inner member 5 is adapted to rotate on the axle 19 of the vehicle (not shown), and a screw threaded cap 20 prevents it from becoming disengaged therefrom.

The outer or spoke member 6 is composed of a series of annular plates 30' and 30' arranged in pairs so as to form annular grooves 31, which are adapted to be engaged by the annular plates 10 secured to the hub member 5. The outer edge of these annular plates 30 are preferably provided with annular angular grooves 32 and tongues 33 adapted to fit one within another and form a rigid construction, an annular metallic plate or cap 34 covering the peripheries of the plates through which are adapted to extend transversely bolts 35.

Centrally disposed between the plates 30' is an annular rigid track member 36, on the inner periphery of which are a plurality of annular grooves 37, which are adapted to form race ways for balls 38, of a ball bearing formed by the inner felly 18 and rim 36. Spokes 39 are secured by bolts 40 to the upper annular rims 41 of the cap 34.

The outer faces of plates 30 are provided with a series of pins or rollers 42, which are adapted to enter the annular recesses or depressions 12, thus allowing sufficient play between the members 5 and 6 and at the same time holding them in engagement with one another and preventing any accidental displacement. Spokes 39 are secured to the inner periphery of felly 43 of the outer member, which is provided with an annular recess or seat 44 in which is adapted to rest a solid elastic tire 45.

In operation as the outer member 6 of the wheel rotates the pins 42 secured to the plates 30 engage the sides of the recesses 12 formed in the plates 11, and carry the inner or hub member 5 with it. If the vehicle should be passing over a rough road the shock to the outer member 6 is communicated to the springs of the inner member 5, thus relieving the vehicle of all jar and vibration, the recesses 12 being circular permitting a sufficient upward play of the outer member without its becoming disengaged. If desired a pneumatic tire could be substituted for the springs 13 without materially changing the construction, except to form an opening in the plates for the exit of the air inlet tube from the pneumatic tire.

It will be observed from the foregoing description that I have produced a vehicle wheel in which the outer pneumatic tire is dispensed with without sacrificing any of the resilient qualities usually attributed to that form of cushion.

Having described my invention, what I claim as new and desire to secure by Letters Patent, is:

1. An interacting vehicle wheel, comprising a hub member having a resiliently supported felly and annular guide plates secured thereto, and an outer member comprising two annular rigid members connected together by spokes, and having a plurality of plates secured thereto so as to form annular grooves, said grooves adapted to engage the guide plates of the hub member, whereby the two members are held in engagement.

2. An interacting vehicle wheel, comprising a hub member having a resiliently supported felly and annular guide plates secured thereto, the inner faces of the outer guide plates having circular recesses formed therein; an outer member comprising two annular rigid members connected together by spokes, and having a plurality of plates secured thereto so as to form annular grooves, said grooves adapted to engage the guide plates of the hub member; and a plurality of engaging pins secured to the outer faces of the plates secured to the outer member adapted to engage the circular recesses formed on the inner faces of the outer guide plates secured to the hub member, whereby the two members are held in engagement.

In witness that I claim the foregoing I have hereunto subscribed my name this 14th day of November, 1906.

NATHANIEL DRYDEN.

Witnesses:
   EDMUND A. STRAUSE,
   G. E. HARPHAM.